(12) United States Patent
Singh et al.

(10) Patent No.: US 9,495,967 B2
(45) Date of Patent: Nov. 15, 2016

(54) COLLABORATIVE AUDIO CONVERSATION ATTESTATION

(71) Applicant: Intel Corporation, Santa Clara, CA (US)

(72) Inventors: Dave Paul Singh, Portland, OR (US); Dominic Fulginiti, Beaverton, OR (US);
(Continued)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 14/124,431

(22) PCT Filed: Aug. 20, 2013

(86) PCT No.: PCT/US2013/055789
§ 371 (c)(1),
(2) Date: Dec. 6, 2013

(87) PCT Pub. No.: WO2015/026329
PCT Pub. Date: Feb. 26, 2015

(65) Prior Publication Data
US 2015/0058017 A1 Feb. 26, 2015

(51) Int. Cl.
*G10L 17/00* (2013.01)
*G10L 17/22* (2013.01)
(Continued)

(52) U.S. Cl.
CPC .............. *G10L 17/22* (2013.01); *G06F 21/10* (2013.01); *G06F 21/6218* (2013.01);
(Continued)

(58) Field of Classification Search
CPC .......... G06F 21/10; G06F 3/165; G10L 17/02; G10L 17/04; H04L 2463/101; H04L 63/102; H04L 63/12; H04L 65/403
(Continued)

(56) References Cited

U.S. PATENT DOCUMENTS 6,477,491 B1 * 11/2002 Chandler ................ G10L 15/26
704/235
6,980,953 B1 * 12/2005 Kanevsky ............. G06F 17/289
704/2
(Continued)

FOREIGN PATENT DOCUMENTS

WO WO-2015026329 A1 2/2015

OTHER PUBLICATIONS

"International Application Serial No. PCT/US2013/055789, International Search Report mailed May 20, 2014", 3 pgs.
(Continued)

*Primary Examiner* — Michael Colucci
(74) *Attorney, Agent, or Firm* — Schwegman Lundberg & Woessner, P.A.

(57) ABSTRACT

Disclosed in some examples are systems, methods, devices, and machine readable mediums which may produce an audio recording with included verification from the individuals in the recording that the recording is accurate. In some examples, the system may also provide rights management control to those individuals. This may ensure that individuals participating in audio events that are to be recorded are assured that their words are not changed, taken out of context, or otherwise altered and that they retain control over the use of their words even after the physical file has left their control.

19 Claims, 7 Drawing Sheets

(72) Inventors: Mahendra Tadi Tadikonda, Portland, OR (US); Tobias Kohlenberg, Portland, OR (US)

(51) Int. Cl.
*G10L 15/26* (2006.01)
*G06F 21/10* (2013.01)
*G06F 21/62* (2013.01)
*H04L 29/06* (2006.01)
*G10L 19/018* (2013.01)

(52) U.S. Cl.
CPC ............ *G10L 15/26* (2013.01); *G10L 19/018* (2013.01); *H04L 63/0861* (2013.01); *H04L 65/1089* (2013.01); *H04L 65/403* (2013.01); *G06F 2221/2141* (2013.01); *H04L 2463/101* (2013.01)

(58) Field of Classification Search
USPC ................. 704/249, 235, 239, 246; 84/625; 726/26, 27; 725/18, 46; 713/168; 709/231; 707/634; 455/406, 414.1; 379/68, 373.01, 201.02; 348/211.12
See application file for complete search history.

(56) References Cited

U.S. PATENT DOCUMENTS

| | | | |
|---|---|---|---|
| 7,516,078 B2* | 4/2009 | Dhawan | H04M 1/7253 379/87 |
| 8,081,751 B1* | 12/2011 | Martin | H04M 3/42017 379/373.01 |
| 8,428,227 B2* | 4/2013 | Angel | G10L 15/26 379/68 |
| 8,539,543 B2* | 9/2013 | Schnell | G06F 21/10 726/1 |
| 8,660,539 B2* | 2/2014 | Khambete | G06F 17/30699 370/310.2 |
| 8,826,316 B2* | 9/2014 | Jain | G06F 3/061 704/500 |
| 8,831,196 B2* | 9/2014 | Moyers | G06Q 10/10 370/352 |
| 8,931,059 B2* | 1/2015 | Moroney | G06F 21/10 726/10 |
| 9,154,534 B1* | 10/2015 | Gayles | H04L 65/60 |
| 2004/0230797 A1* | 11/2004 | Ofek | G06F 21/14 713/168 |
| 2004/0263636 A1* | 12/2004 | Cutler | H04N 7/15 348/211.12 |
| 2005/0198510 A1* | 9/2005 | Robert | G06F 21/10 713/175 |
| 2007/0245378 A1* | 10/2007 | Svendsen | H04N 7/17318 725/46 |
| 2007/0274293 A1 | 11/2007 | Forbes | |
| 2008/0115224 A1* | 5/2008 | Jogand-Coulomb | G06F 21/10 726/27 |
| 2008/0115225 A1* | 5/2008 | Jogand-Coulomb | G06F 21/79 726/27 |
| 2009/0043573 A1 | 2/2009 | Weinberg et al. | |
| 2010/0095829 A1* | 4/2010 | Edwards | G10H 1/365 84/625 |
| 2010/0333209 A1* | 12/2010 | Alve | G06F 21/10 726/26 |
| 2011/0039518 A1* | 2/2011 | Maria | H04L 12/66 455/406 |
| 2011/0113011 A1* | 5/2011 | Prorock | G11B 27/36 707/634 |
| 2011/0145000 A1 | 6/2011 | Hoepken et al. | |
| 2011/0288866 A1* | 11/2011 | Rasmussen | H04L 12/1831 704/246 |
| 2012/0232900 A1* | 9/2012 | Brummer | G10L 17/02 704/239 |
| 2013/0136242 A1 | 5/2013 | Ross et al. | |
| 2013/0318624 A1* | 11/2013 | Monsifrot | G06F 21/10 726/26 |

OTHER PUBLICATIONS

"International Application Serial No. PCT/US2013/055789, Written Opinion mailed May 20, 2014", 6 pgs.

* cited by examiner

COLLABORATIVE AUDIO CONVERSATION ATTESTATION

PRIORITY APPLICATION

This application is a U.S. National Stage Application under 35 U.S.C. 371 from International Application No. PCT/US2013/055789, filed Aug. 20, 2013, which is hereby incorporated by reference in its entirety.

TECHNICAL FIELD

Embodiments pertain to audio recording. In particular, some embodiments pertain to audio verification and control.

BACKGROUND

Audio conversations may be recorded by a number of audio capture technologies. For example, computing devices may capture audio using an on-board or connected microphone and store it digitally in flash memory or other storage. Example computing devices include a personal digital recorder, a laptop, a desktop, a cellphone, a portable music player (e.g., an iPod™), or the like. The digital audio files created by these devices may be accessed by users after the recording is complete.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
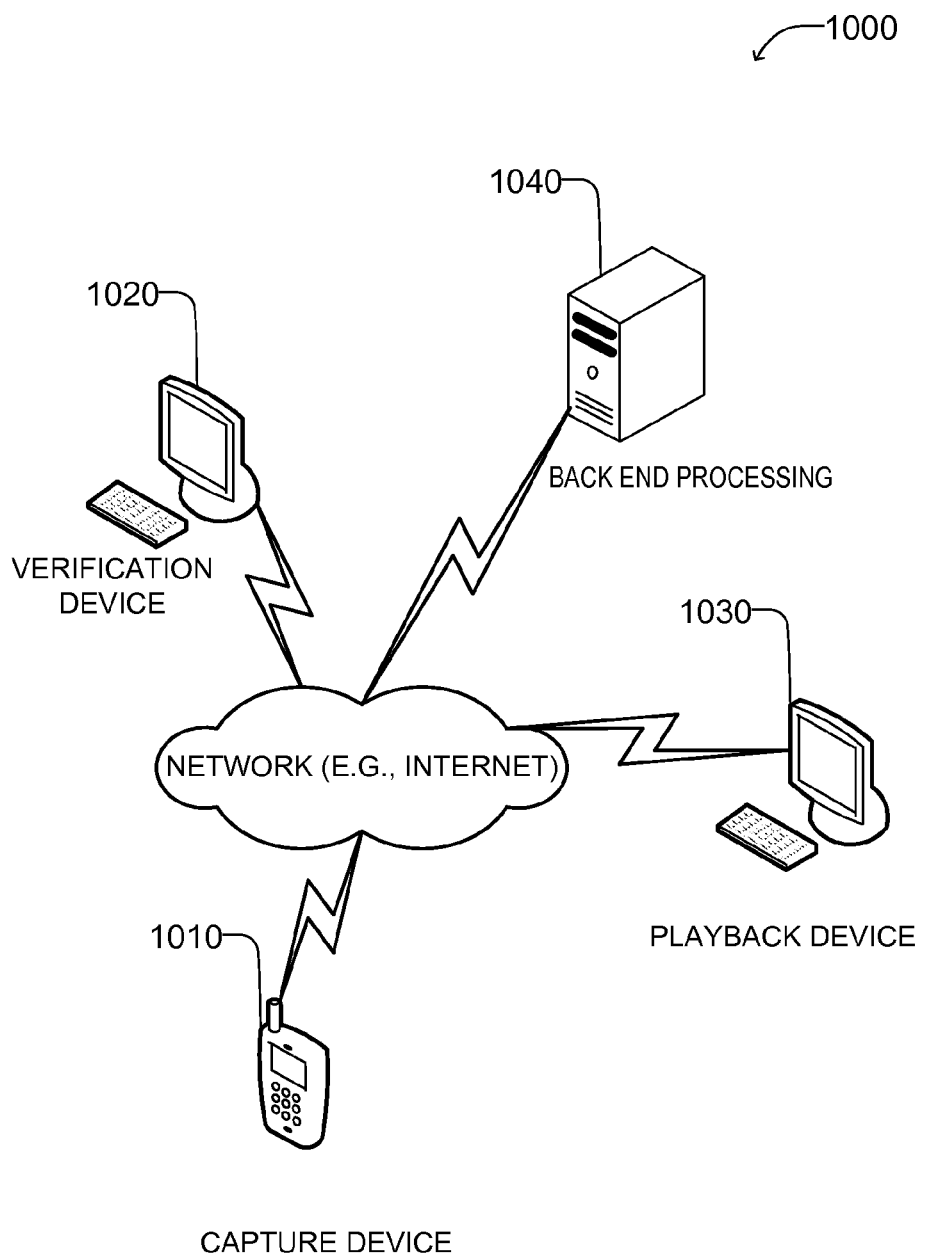
FIG. 1 is a high level schematic of a system according to some examples of the present disclosure.

The digital audio files created by digital audio recording devices are not generally subject to any modification or access controls other than a physical access control which resides with individuals having access to the audio files. For example, the owner of the digital audio recording device may control the distribution and use of the audio by preventing others from accessing the audio files. This control may be easily lost once the file is distributed to others as the digital recording may then be redistributed quickly over email, file transfer protocol (FTP), torrent sites, or the like. In addition to losing control over the distribution of the file, since the file is not protected, the contents of the file may be tampered with by using audio editing software to change the words spoken, make it seem as if the words were spoken by others, or to change the context of a given quote. These problems can make individuals apprehensive about being recorded, and can make the use of audio as evidence less than ideal in tribunals and other venues where standards of custody and control are desired.

Disclosed in some examples are systems, methods, devices, and machine readable mediums which may produce an audio recording with included verification from the individuals in the recording that the recording is accurate. In some examples, the system may also provide rights management control to those individuals to prevent unauthorized uses of their audio, such as unauthorized modifications. This may ensure that individuals participating in audio events that are to be recorded are assured that their words are not changed, taken out of context, or otherwise altered without permission and that they retain control over the use of their words even after the physical file has left their control.

In some examples, this may be accomplished by determining a plurality of segments of the audio recording based upon an identification of one or more active speakers that were speaking during that segment. Each audio segment may be presented to the active speaker or speakers that were identified as speaking in that segment for verification. The verification asks the speaker to affirm that the words captured represent the words spoken by that speaker. The identified active speaker may also setup rights management controls (Digital Rights Management (DRM)) to control the dissemination for each segment. Each segment may have different DRM applied.

This process ensures that the individuals identified as speaking in each segment have authenticated that what is captured on the segment is a true and accurate recording of their speech, ensures that the words cannot be altered, and ensures that distribution and other rights may be effectively controlled. By breaking the audio into particular segments based upon an active speaker, the control of the file may be distributed amongst all of the participants in the recorded audio event. This ensures that people may speak freely with the knowledge that they are in ultimate control of the use of their words.

Audio events may be any event at which audio is capable of being captured. An audio event may be a meeting, a lecture, a conference, a teleconference, an internet meeting, a concert, a performance, legal testimony, a play, or the like. The audio recording of that event may be just audio, or may be the audio track(s) of a video recording. A segment may be defined as any period of continuous speech by a speaker or group of speakers in the audio recording. For example, in a simple case, the speech segment may begin when a new speaker begins talking and end when the speaker ends talking or when another speaker begins talking. In more complex cases, multiple individuals may be talking at the same time. In these examples, several approaches to defining a segment may be employed. For example, there may be multiple time-overlapping segments. Thus if person A and person B are both talking, then a first segment would be the speech of person A and a second segment may be the speech of person B. The beginning and ending time indices of these segments may overlap. This approach may be employed where the audio capture is of a nature in which the sound processing equipment and/or software may distinguish between multiple active speakers. In other examples, a single segment may be used which may be attributable to multiple speakers. In these examples, various rules may be employed to determine which controls may be exercised by which speakers in the segment. For example, all speakers may need to authenticate the segment, and all speakers may add DRM rights to the segment.

As already noted, the system may break the audio event into segments based upon one or more identified active speakers. Active speakers are individuals who are speaking during a particular point in the audio. In some examples, after the audio event, speakers may be recognized manually by one or more individuals who may tag the audio recording with information on which speaker is talking at particular points. In yet other examples, recognition of active speakers may be done automatically during the recording (on the fly) or automatically during post processing of the audio recording of the audio event. The system may use various speaker recognition algorithms to determine one or more active speakers. Prior to recording the meeting or other audio event, the individuals who are present may identify themselves and submit a short speech exemplar. The system may then use the exemplars to create unique voice prints for each individual. As the audio capture event progresses, or once the audio capture event has completed, various segments of the audio may be identified based upon a comparison of the recorded audio with the voice prints using one or more speaker recognition algorithms. The identified segments may be automatically tagged with the identities of the recognized speakers.

After the audio event is complete, each tagged segment may be submitted to the recognized speakers identified as speaking in that segment for verification that the tagged segment is a true and correct recording of the words spoken by those speakers. This verification may happen on the audio capture device, or it may happen on various general purpose computing devices owned or used by the identified speakers. The information sent to each recognized speaker may include an audio clip which may be the recorded audio of the segment, a transcript of the segment, or other information about the segment.

In some examples, the verification may be spoken and the verification process may compare the previously captured voice exemplar or voice print with the spoken verification to ensure that the verification is being made by the person who is speaking in the segment. In addition to, or instead of spoken verifications, other types of biometric security may also be used to enhance this process. For example, the verification process may capture a fingerprint or other biometric property from a user prior to recording the audio event during the capture of the voice exemplars. During the verification process, this biometric property may be collected again and compared with the previously collected biometric property to ensure the verification is authentic. The biometric information may be sent as part of the segment information to a computing system of the speaker and the computing system of the speaker may verify that the biometric matches. In other examples, the biometric information may be included as part of the verification response and the capture system may verify the biometric data.

The speaker's verification information may be tagged to the distributable audio file to indicate their approval. Segments not approved or conditionally approved may be left in the file (and the lack of verification serving as an implicit signal of disapproval), may be tagged with their conditional approval or disproval (serving as an explicit signal of disapproval. In some examples, a user may redact portions of the audio (and any transcript created of that audio). For example, a portion that is not verified may be redacted automatically by the system. In other examples, even verified sections may be chosen to be redacted by speakers.

The speaker(s) may also tag each segment with certain DRM restrictions to control the presentation and use of each audio segment. In some examples, the distributable file created by the system may include DRM preventing modification of the audio contents of the file by default. This ensures that once the audio is verified by the constituent speakers, it cannot be altered. In some examples, the distributable file may be altered but the speaker verifications may be removed—which may signal that it has been modified. Once all speakers have verified their respective contributions and specified any desired DRM, the recording system may create a master file which may include the verification information (e.g., which segments are verified) and the DRM restrictions. Individuals who would like to make use of the master recording may do so subject to the DRM restrictions.

This process may be facilitated through the use of a recording device. The recording device may automatically perform one or more of the steps described above. For example, the recording device may perform one or more of: recording the voice exemplars, identifying the segments, tagging the audio segments, sending the information for each segment to each tagged speaker for verification and DRM application, and receiving the verification and DRM restrictions. The recording device may then create a distributable file with the authentication information and the DRM restrictions. In some examples, the recording device may be a personal digital recorder, a computing device (such as a desktop computer, laptop computer, tablet computer, smartphone), or the like. In some examples, the recording device may perform some of the aforementioned functionality and one or more other computing devices may perform the rest. In yet other examples, some or all of the aforementioned functionality may be performed by a cloud based service, such as those associated with a conference call service in which multiple users call in to have a teleconference. Example conference call services may include GoToMeeting® from Citrix Online, LLC, Uberconference® by Firespotter, Inc., and the like. These services may offer a phone bridge between multiple users and may include a feature to record conference calls. These services may incorporate the features of the present disclosure in their computing systems to provide for verification and DRM of the meeting. While some of the operations may be performed by one or more computing or recording devices, other portions of the operations may be performed by other computing devices in a distributed fashion.

Turning now to FIG. 1, an example high level schematic of a system 1000 according to some examples of the present disclosure is shown. Capture device 1010 may capture the audio of the audio event. Among other components, capture device 1010 may have a microphone and a processor which may perform one or more of: capturing the voice exemplars, extracting an audio print from the voice exemplars, recording the audio event, identifying the audio segments, identifying active speakers in each segment, creating the distributable audio file. In some examples, capture device 1010 may also handle verifications and DRM selection. In other examples, capture device 1010 may send information about each segment to one or more verification devices 1020 for verification by the identified speakers and DRM addition. For example, verification devices 1020 may be computing devices owned by one of the identified speakers and which may be addressable by electronic contact information given the system by the identified speaker. In yet other examples, capture device 1010 may handle some verifications and DRM selections and verification devices 1020 may handle others. The capture device 1010 may receive the responses from the verification devices 1020 and may create the final distributable audio file. In other examples, a back end processing device 1040 may perform one or more of the steps performed by the capture device 1010 or verification devices 1020, such as identification of segments and/or distribution to individuals. For example, the capture device 1010 may record the voice exemplars and the audio event and send the audio file to the back end processing device 1040 for processing (e.g., identifying the voices, creating the segments, and handling verification and DRM, and creating the distributable audio file). A playback device 1030 may playback the distributable audio file subject to any DRM restrictions on the distributable file. For example, the audio file may be in a proprietary format and/or encrypted as a result of the DRM applied to it. This format and encryption may be capable of being played by only certain applications that are trusted to enforce the appropriate DRM restrictions. In some examples, one or more of the verification device 1020, playback device 1030, back end processing device 1040, and capture device 1010 may be the same device.

Figure 2:
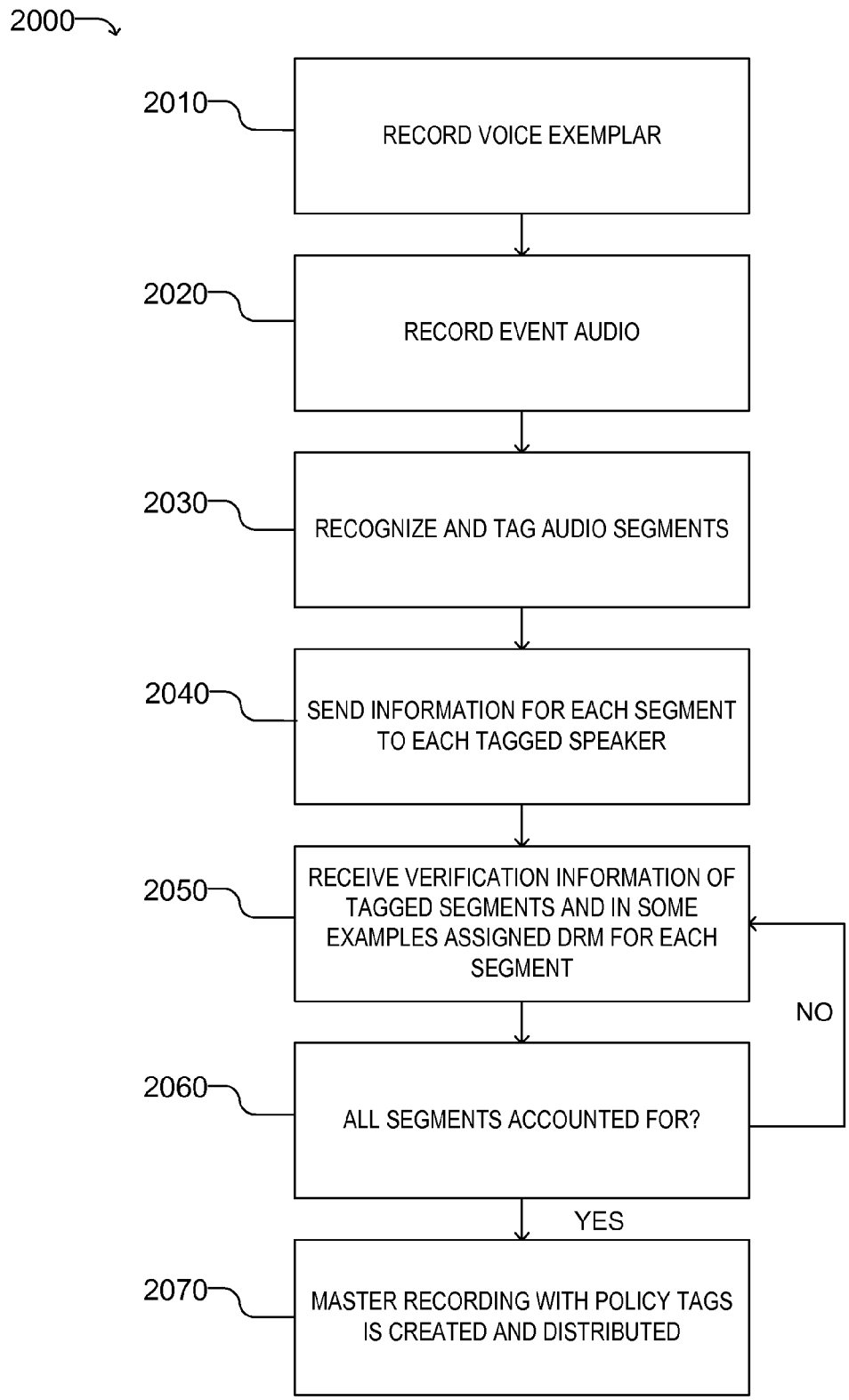
FIG. 2 is a flowchart of a method according to some examples of the present disclosure.

Turning now to FIG. 2, a flowchart of a method 2000 according to some examples is shown. At operation 2010, prior to the start of the audio event, those participants who are present, or who anticipate speaking may submit a voice exemplar. The voice exemplar may be a word, phrase, sentence, or passage which may be predetermined and which may be selected so as to record certain distinguishing sounds. These voice exemplars may be utilized to extract a number of voice related features called a voice print. The voice print may then be used to identify active speakers during the audio recording. A voice print comprises any information that can be used to distinguish a person's speech from that of another person. For example, it may comprise one or more distinctive patterns of speech characteristics. Example characteristics include frequency or pitch, speed, word pronunciation, dialect, or the like. For example, the individual may input an identifier (e.g., their name) and read a verbal passage or phrase. In some examples, the individuals may also give electronic contact information (e.g., an email address, an Internet Protocol (IP) address, or the like), which may be used by the system to automatically send segments for verification and DRM selection to recognized speakers. The identifier and contact information may be provided orally (e.g., recorded by the system and then, through speech recognition algorithms translated into computer readable data) or through an input mechanism such as a keyboard. This process may continue until all the individuals who are to speak have provided exemplars.

While in some examples, the exemplars are given before the audio event, in other examples, the system may have a setup process in which users may pre-record their voice exemplars (e.g., voice exemplars). The system may then store a library of voice exemplars and use the library to determine active speakers. In other examples, prior to the audio event, the meeting participants may supply the system their credentials (created when they completed the setup process) and the system may speed up processing by prefetching the voice exemplars from a database (e.g., onboard storage, remote storage accessible by a network, or the like).

At operation 2020, the audio event recording begins. At operation 2030, the recording system recognizes and tags audio segments with information on the identities of active speakers. This operation may be done after the audio event is complete or as the audio is being recorded.

Figure 3:
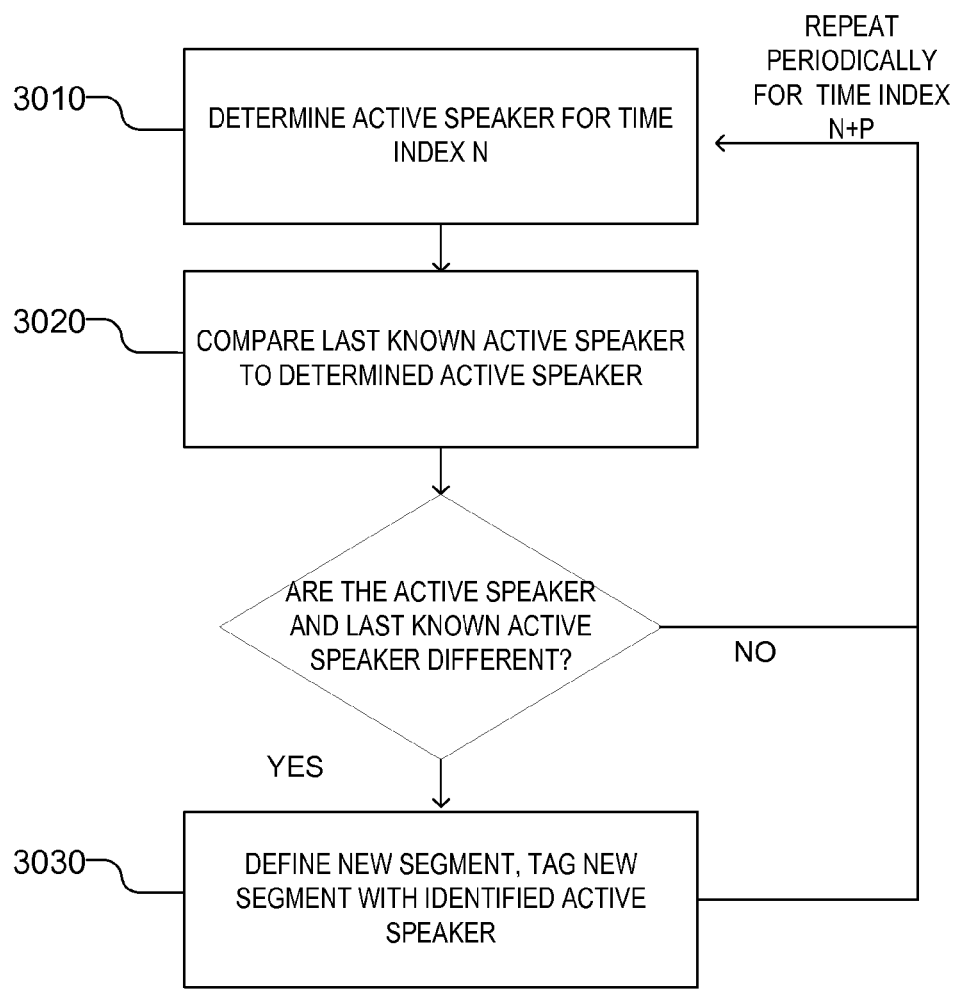
FIG. 3 is a flowchart of a method of recognizing audio segments according to some examples of the present disclosure.

FIG. 3 shows a flowchart of a method 3000 of recognizing audio segments according to some examples of the present disclosure. As the audio is being recorded or being processed (if segmentation happens after the audio event is concluded), an active speaker may be determined based upon a comparison between the voice currently speaking at the particular examined time index N and the voice prints created from the speech exemplars at operation 3010. Various speaker recognition algorithms may be used such as frequency estimation, hidden Markov models, Gaussian mixture models, pattern matching algorithms, neural networks, matrix representation, vector quantization, decision trees, or other algorithms. Once an identity of the speaker has been determined, at operation 3020 the determined active speaker is compared to a last known speaker to determine if a change in speaker has occurred. If the active speaker and the last known active speaker are different, a new segment is defined at operation 3030 and the new segment is tagged with the active speaker identified in operation 3010. If the active speaker is the same as the last known active speaker, the current segment is continued. In some examples, this process may be repeated periodically at a particular sampling frequency P so as to capture change in speaker events (in order to generate new segments). In other examples, the method of FIG. 3 may be triggered by continuously monitoring for aural clues that the speaker has changed (e.g., monitoring for changes in pitch, volume, frequency, or the like).

The method 3000 of FIG. 3 may also be employed in situations in which multiple speakers may speak at the same time, or nearly the same time. In those scenarios, the active speaker determined in operation 3010 may be multiple active speakers, and the comparison at operation 3020 may be a comparison to determine if a different group of active speakers are speaking. For example, if at time index N, Bill and Jill are speaking, and then at time index N+P Bill, Jill, and Chris are speaking, then because the group of active speakers of Bill and Jill is different than the active speaker group of Bill, Jill, and Chris, a new segment may be created.

In some examples, segments may be a minimum length. This may be created by setting P to a minimum value (e.g., 3 seconds). In some examples, the system may sample the segments every P seconds, but upon finding a change in segment, may adjust the segment to capture the exact point at which the active speaker (or group of active speakers) changes. For example, the system may "rewind" the audio to determine the exact moment where the active speaker or group of active speakers changed. This may prevent the segment from starting in the middle of someone's speech.

Turning back to FIG. 2, once the audio segments are recognized and tagged, information for each of the audio segments may be sent to each identified speaker or group of speakers at operation 2040. The information for the segments may provide information to the identified speaker(s) to assist them in verifying the segment. Example information on the segments include one or more of: all of, or portions of, the audio of the segment or the recording as a whole; an automatically generated transcript of the audio of that segment or the recording as a whole that are generated automatically based upon speech recognition algorithms; information on identified speakers; meta data regarding the segment or audio as a whole such as segment length, segment position in the audio event; or any other information about the segment or the audio as a whole. In some examples, in order to provide additional context to speakers when verifying segments, the system may provide a certain amount of segment information for segments just before and after the segment of interest.

The identified speakers may then decide whether or not the segment is to be verified or not, and whether or not to include DRM restrictions. The identified speakers may utilize the information provided to them by the system. The system may then receive their approval, conditional approval, or denial and the choice of DRM for the segment. An approval indicates that the segment contains an accurate portrayal of the individual's speech during the segment. A conditional approval is one in which some parts of the segment are accurate and other parts are not. A conditional approval may specify which parts of a segment are approved and which are not. A denial is a condition in which the segment is not verified. The segment may then be tagged with this indication. The segment may also be tagged by the DRM chosen by the individual. If multiple individuals are identified as active speakers in a segment, each speaker's verification, conditional verification, or denial is added to the segment. If multiple individuals submit DRM, each DRM decision is also added to the segment.

Example DRM restrictions include restrictions on copying, accessing, modifying, distributing, transcribing (e.g., restrictions on any digital copy of the text translation of the audio) or deleting the segment. In some examples, the DRM may prohibit anyone from performing these activities, but in other examples, the DRM may prohibit or allow only certain users (or groups of users) from performing these acts. In yet other examples, the DRM may prohibit certain users (or groups of users) from performing these acts unless permission is obtained from the identified speaker placing the DRM restriction on the segment. In examples in which multiple individuals place DRM on the same segment, any usage of the segment, such as playing back the segment, may require that the user satisfy all of the DRM restrictions placed on the segment by all of the identified speakers. In some examples, the system may only play back tracks (e.g., voices) associated with DRM policies that are satisfied. For example, if three people are talking in a segment and the DRM policy is only satisfied for two of the speakers, then only those two are played back (the other person is muted or bleeped out).

At operation 2050, the system receives the verification and the DRM restrictions for the segments. At operation 2060, the system checks to determine whether all the segments are verified. If not all the segments are accounted for, the system may send a reminder to identified speakers who have not submitted all of the segments. If a predetermined time period passes and all speakers of all segments have not been accounted for, the system may take appropriate action. For example, the system may not attach any verification information to that segment and may attach a default DRM for unacknowledged segments. In other examples, the system may not necessarily need to account for verification to allow dissemination of parts that have been approved. For example, parts not approved may be redacted until they are approved.

At operation 2070, once the segments are all accounted for (or the time has elapsed on unaccounted for segments), a master recording may be created which may include the various speaker tags, verification tags, and DRM restrictions.

Figure 4:
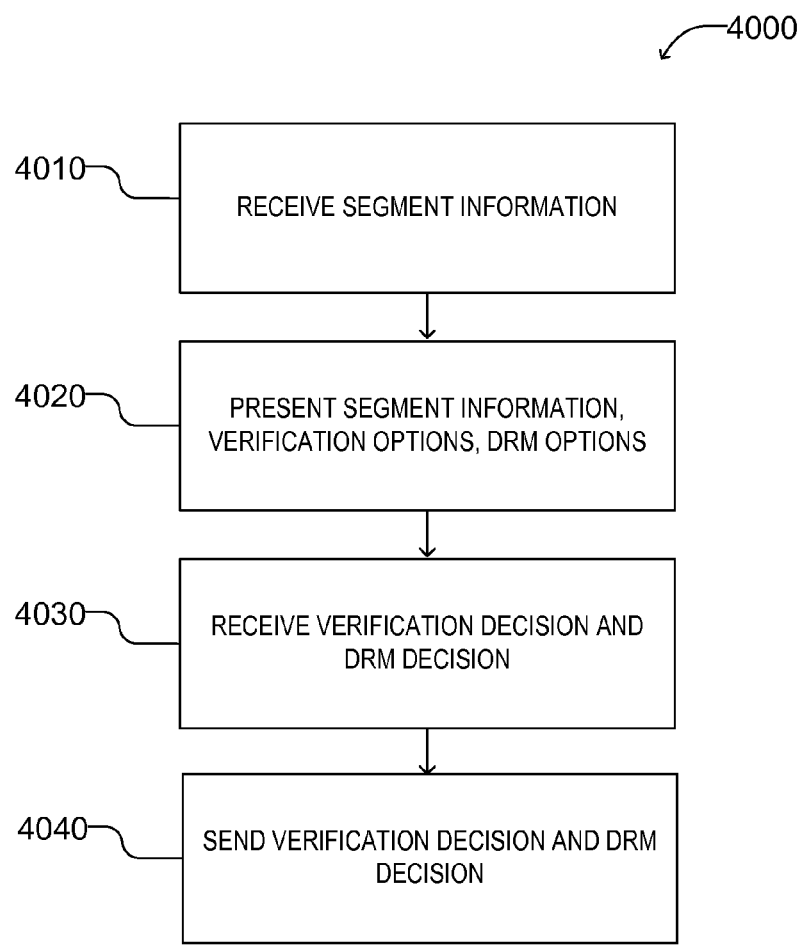
FIG. 4 is a flowchart of a method of verifying and applying DRM to a segment according to some examples of the present disclosure.

Turning now to FIG. 4, a flowchart of a method 4000 of verifying and applying DRM to a segment according to some examples of the present disclosure is shown. At operation 4010, segment information is received at the verification and DRM process. In some examples, this segment information may be received at a separate computing device from the device used to record the audio event. For example, the segment information may be received from a capture device 1010 or a back end processing device 1040 from FIG. 1. In other examples, the capture device may also perform the verification and DRM tagging. In these examples, the segment information may be received from a separate module of the capture device.

As previously explained, the segment information may include audio of the segment, a transcript of the segment, meta data about the segment (e.g., size in bytes, length, position in the audio event, time recorded, date, or the like), information on identified active speakers, or the like. At operation 4020, segment information may be presented to an active speaker. For example, the audio file may be played, the transcript displayed, the meta data presented, and the like. Additionally, options for verification and for application of DRM may be shown.

The user may then determine whether or not to verify the segment and what, if any, DRM to apply to that segment. The verification and DRM process may receive the decision of the user and the DRM selections at operation 4030. Once the decisions have been made, the verification information and DRM may be sent back to the source of the segment information (e.g., the capture device, the back end server, or another process or module) at operation 4040.

Figure 5:
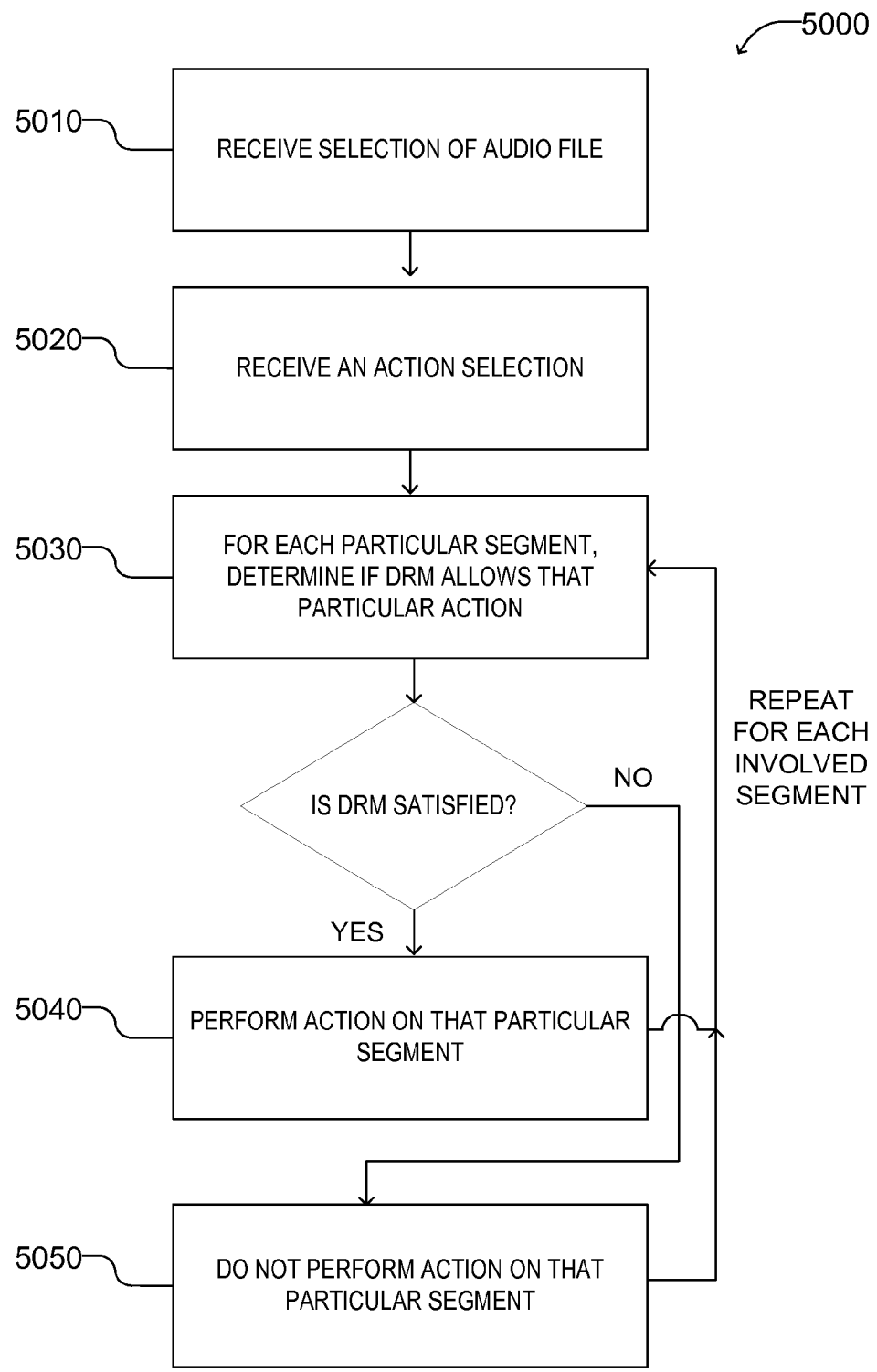
FIG. 5 is a flowchart of a method of an application utilizing a protected distributable file according to some examples of the present disclosure.
Figure 6:
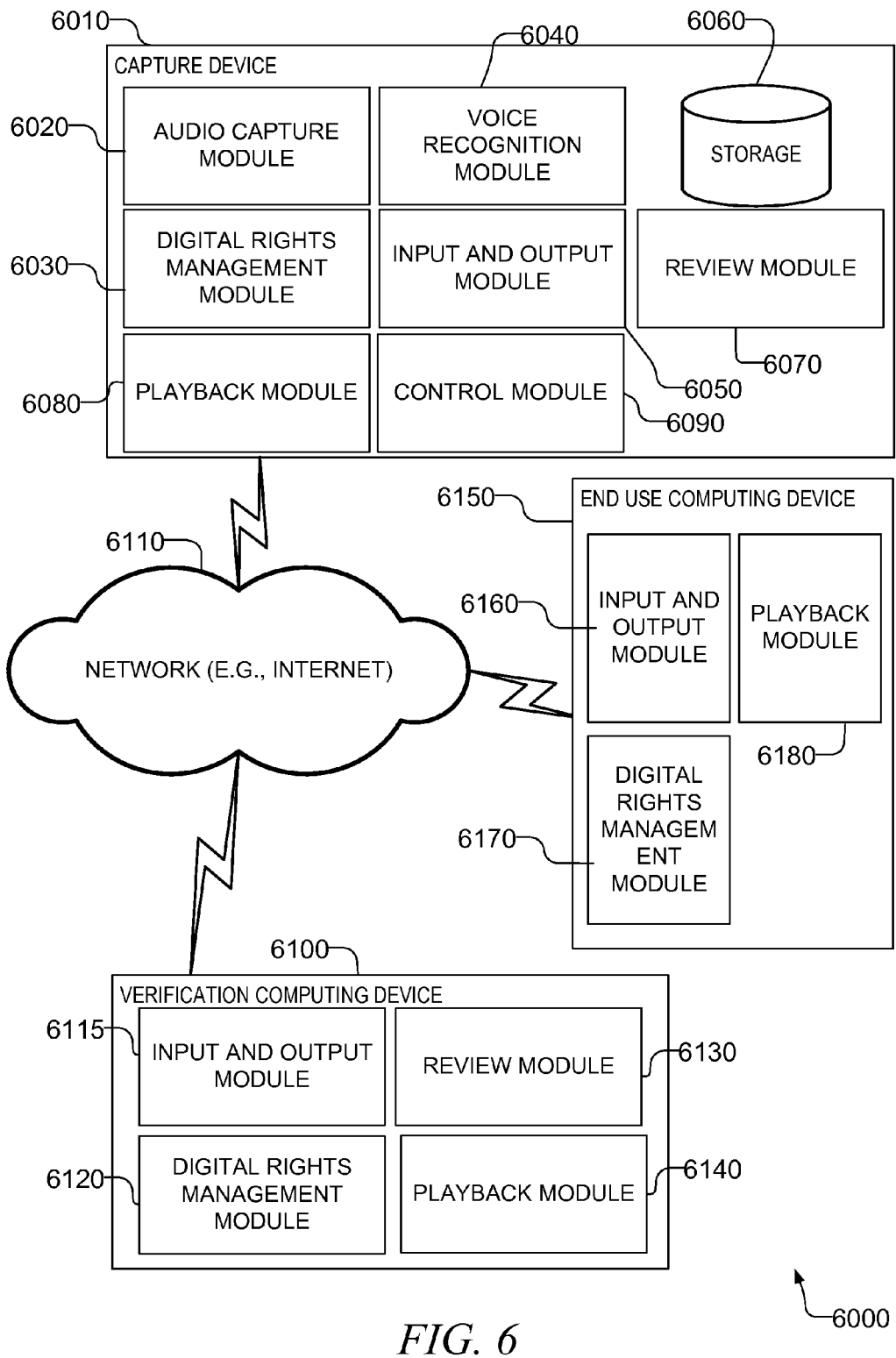
FIG. 6 is a schematic of a system according to some examples of the present disclosure.

FIG. 5 shows a flowchart of a method 5000 of an application utilizing (e.g., playing, editing) a protected distributable file according to some examples of the present disclosure. At operation 5010, the audio file of interest may be selected and the choice may be received by the application. At operation 5020, a desired action may be chosen and the selection may be received by the application. For example, the user of the application may desire to play the audio file. In other examples, other actions may include modifying the file, modifying the audio, viewing the verification information, viewing the segment information, or the like. For each segment in the audio file to which the action relates, the application determines whether the DRM conditions associated with that segment are met based upon the action selected, the permissions of the user of the application, and the DRM tagged to the segment at operation 5030. If at 5040 the DRM conditions are satisfied, the action is performed. For example, if the user has permission to play the audio, and the action is to play the audio, then the audio of the segment is played. If the DRM conditions were not satisfied, then the action is not performed at operation 5050. Operations 5030-5050 may be repeated for each segment that is the subject of the action selection at operation 5020. For example, if the user wants to modify two segments of the audio recording, the operations of 5030-5050 would be repeated for each segment. Thus a user may have permissions to play or modify only certain segments, but not others. In other examples, the application may only allow the action if the DRM conditions are satisfied for the entire audio file. Thus if the user has permission to listen to only some of the segments, but not all the segments, none of the segments may be played. In other examples, if less than all of the DRM conditions are satisfied the action may be partially performed. For example, if the DRM conditions for two of the three speakers in the segment have been satisfied FIG. 6 shows a more detailed schematic of an example system 6000 according to some examples of the present disclosure. The capture device 6010 (e.g., capture device 1010 from FIG. 1) may include an audio capture module 6020 which may capture voice exemplars as well as record the audio event. In some examples audio capture module 6020 may record the identifications and contact information of all the speakers as well. The output of the capture device 6010 may be stored in storage 6060. Storage 6060 may be any local or remote storage such as flash memory, random access memory (RAM), a hard drive, a solid state drive (SSD), optical, magnetic, tape, or other storage device. In some examples, storage 6060 may be on a separate device and the audio information may be sent by the input and output module 6050 to the remote storage.

Capture device 6010 may also include a control module 6090 which may control the process including: controlling audio capture; determining segments based upon analysis of the audio done by the voice recognition module 6040; providing a user interface through input and output module (which may control one or more displays and input devices); creating the final distributable audio file; in some examples, coordinating any review for verification and DRM application on or off the device 6010 by utilizing review module 6070, playback module 6080, and DRM module 6030 or input and output module 6050; and the like.

Playback module 6080 may play back audio stored on storage 6060. In some examples this may be for verification and for adding DRM by identified speakers. In other examples, the device may play the audio file for a user of the device. In these examples, the device utilizes DRM module 6030 to unlock the audio file or portions of the audio file for playback. DRM module 6030 may set access rights (in the case of the verification and adding DRM on the device), verify access rights, and in some examples, depending on the audio format, may unprotect the audio in memory in order to allow playback module to utilize the audio for playback if the device meets the access restrictions on the audio file.

Input and output module 6050 may communicate with one or more other computing devices over network 6110 and may provide one or more user interfaces on device 6010 at the direction of control module 6090. Input and output module 6050 may send the distributable audio file, information on the segments to the identified speakers for verification and DRM tagging, may receive the verification results including the DRM tags, receive user input and the like.

Voice recognition module 6040 may analyze the voice exemplars to generate the voice prints and may determine an active speaker or speakers at a given point in the audio based on the analyzed voice prints. Review module 6070 may coordinate with the control module 6090, playback module 6080, DRM module 6030, input and output module 6050, and storage 6060 to display, play, or otherwise present the segment information to one or more identified speakers and may accept input regarding a verification status of the segment with respect to the identified speaker(s). Review module 6070 and/or control module 6090 may then tag the segment with the verification status and the DRM information.

Verification computing device 6100 may communicate with capture device 6010 over network 6110 through input and output module 6115 to receive information on segments for verification and DRM selection. Input and output module 6115 may also present one or more user interfaces and accept user input from a user of verification computing device 6100. Input and output module 6115 may receive segment information for verification from capture device 6010. The review module 6130 may present the segment information (e.g., the audio or transcript of the audio) to the user through the playback module 6140 and/or the input and output module 6115. The input and output module 6115 may then get the user's verification status (verified, not verified, partially verified) and any DRM that the user wishes to apply to the segment. The review module 6130 may then send this information via the input and output module 6115 through the network 6110.

In addition, playback module 6140 may playback one or more segments of the audio file if the DRM conditions of the audio file are satisfied. The playback module 6140 may utilize DRM module 6120 to decode the audio and determine DRM compliance. In some examples, the modules of verification computing device 6100 may perform the same or similar functions as their counterparts on capture device 6010.

End use computing device 6150 may utilize the distributable audio file. For example the end use computing device 6150 may play the audio file, edit the audio file, redistribute the audio file, and the like. Input and output module 6160 may communicate with verification computing device 6100 and/or capture device 6010 over network 6110. For example, end use computing device 6150 may receive the distributable audio file from the capture device 6010. Playback module 6180 may play the audio, edit the audio file, redistribute the audio file and the like, subject to DRM restrictions. Playback module 6180 may utilize DRM module 6170 which may ensure that the end use computing device 6150 (and in some examples, the user of the end use computing device 6150) has appropriate permission to utilize the audio file in the desired manner.

Network 6110 may be or include portions of one or more of: a Local Area Network (LAN), a Wide Area Network (WAN), the Internet, a cellular network (such as a 3G wireless network or a 4G wireless network), or the like.

The logical organization of functionality shown in FIG. 6 may be re-arranged without departing from the scope of the present disclosure. Thus the functionality of one or more of the modules of capture device 6010, verification computing device 6100 and end use computing device 6150 may be implemented on any of capture device 6010, verification computing device 6100, or end use computing device 6150. Additionally, one or more of capture device 6010, verification computing device 6100, and end use computing device 6150 may be combined into one or more physical devices, or split among several devices.

Example use cases may include police interrogations, depositions, interviews, corporate meetings, life blogging, recording conference calls, arbitration, mediation, courtroom recordings (e.g., as an alternative to expensive court transcriptions), legal statement taking and testimony, or the like. In some examples in which portions of the disclosure are performed outside the capture device, those portions may be performed in a trusted execution space in order to create higher confidence in the security provided. In some examples, the DRM applied may be compatible and readily consumable by standard DRM products. Examples include DRM supplied by Apple, Inc., such as FairPlay, Marlin DRM developed and maintained by the Marlin Developer Community, Adept DRM developed by Adobe, and DRM developed by Amazon.com. In yet other examples, a proprietary DRM may be utilized. With some DRM systems, additional servers may be utilized to verify entitlements, provide decryption keys, and the like. Thus some or all of the functionalities provided by the DRM modules of FIG. 6 may be on a separate server.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computing devices (e.g., a standalone, client or server computing device) or one or more hardware modules of a computing device (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, software embodied in computer-readable medium, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry (e.g., a FPGA or an ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
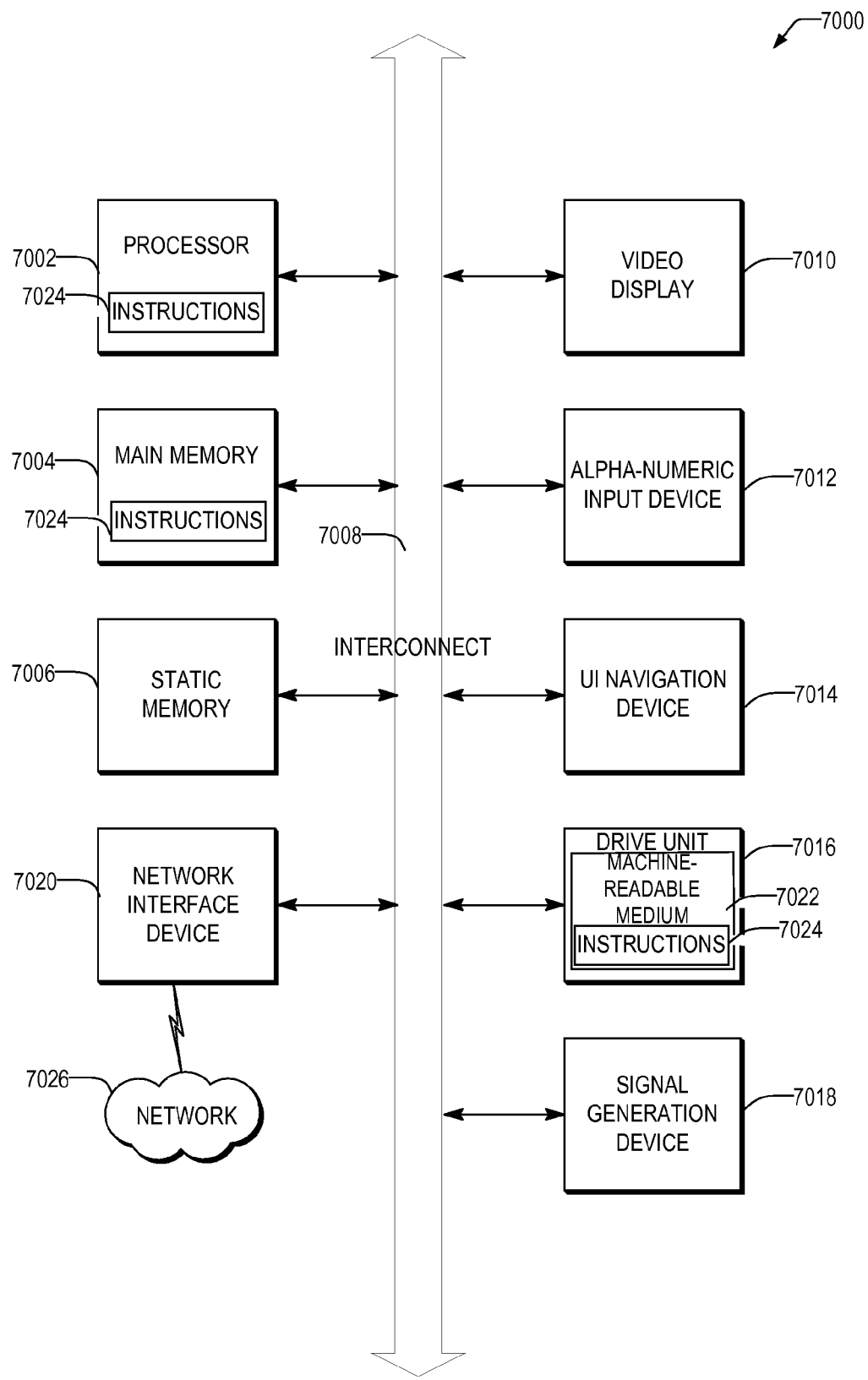
FIG. 7 is a block diagram illustrating an example of a machine upon which one or more embodiments may be implemented.

FIG. 7 is a block diagram of machine in the example form of a computing device 7000 within which instructions, for causing the machine to perform any one or more of the methodologies discussed herein, may be executed. For example, any one of the components shown in FIGS. 1 and 6 may be or contain one or more of the components described in FIG. 7. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 7 or only a subset of the components shown in FIG. 7.

The example computing device 7000 includes a processor 7002 (e.g., a central processing unit (CPU) (e.g., a computer processor), a graphics processing unit (GPU) or both), a main memory 7004 and a static memory 7006, which communicate with each other via an interconnect 7008, such as a bus. The computing device 7000 may further include a video display unit 7010 (e.g., a liquid crystal display (LCD) or a cathode ray tube (CRT)). The computing device 7000 may also include an alphanumeric input device 7012 (e.g., a keyboard), a user interface (UI) navigation device 7014 (e.g., a mouse), a disk drive unit 7016, a signal generation device 7018 (e.g., a speaker) and a network interface device 7020. In some examples, the device may be or contain a System on a Chip (SoC) comprising one or more of the components of FIG. 7.

The disk drive unit 7016 includes a machine-readable medium 7022 on which is stored one or more sets of instructions and data structures (e.g., software) 7024 embodying or used by any one or more of the methodologies or functions described herein. The instructions 7024 may also reside, completely or at least partially, within the main memory 7004, static memory 7006, and/or within the processor 7002 during execution thereof by the computing device 7000, the main memory 7004 and the processor 7002 also constituting machine-readable media.

While the machine-readable medium 7022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 7024 may further be transmitted or received over a communications network 7026 using a transmission medium. The instructions 7024 may be transmitted using the network interface device 7020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., Wi-Fi® and WiMAX® networks). The term "transmission medium" shall be taken to include any intangible medium that is capable of storing, encoding or carrying instructions for execution by the machine, and includes digital or analog communications signals or other intangible media to facilitate communication of such software. Network interface 7020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Other Notes and Examples:

Example 1 includes subject matter (such as a method, means for performing acts, machine readable medium including instructions which, when performed by a machine cause the machine to perform acts, or an apparatus configured to perform) receiving a voice exemplar from each of a plurality of individuals; recording an audio event; determining a plurality of audio event segments of the audio event, the audio event segments determined based upon changes in at least one identified active speaker, each segment having at least one corresponding identified active speaker, the identification based upon the received voice exemplars; receiving verification information for at least one segment from the corresponding identified active speaker for the at least one segment; and responsive to receiving verification information for at least one segment, producing a master audio file including the tagged segments and verification information.

In example 2, the subject matter of example 1 may optionally include, sending a verification request for the at least one segment to the corresponding at least one identified active speaker for that segment.

In example 3 the subject matter of any one or more of examples 1-2 may optionally include, wherein the verification request includes an audio clip of the segment.

In example 4 the subject matter of any one or more of examples 1-3 may optionally include, comprising automatically generating a transcript of each segment and wherein the verification request includes the transcript of the segment.

In example 5 the subject matter of any one or more of examples 1-4 may optionally include wherein the verification request includes biometric data.

In example 6 the subject matter of any one or more of examples 1-5 may optionally include, wherein the biometric data includes a voice print of a recipient active speaker of the segment.

In example 7 the subject matter of any one or more of examples 1-6 may optionally include, comprising receiving digital rights management information for a respective segment from the at least one corresponding identified active speaker for the respective segment, and wherein producing a master audio file comprises including the digital rights management information in the master audio file.

In example 8 the subject matter of any one or more of examples 1-7 may optionally include, wherein the digital rights management information defines a set of access permissions for a user group.

In example 9 the subject matter of any one or more of examples 1-8 may optionally include, wherein the set of access permissions includes at least two of: read access, write access, and distribute access.

In example 10 the subject matter of any one or more of examples 1-9 may optionally include, wherein the method is performed by a recording device.

In example 11 the subject matter of any one or more of examples 1-10 may optionally include, wherein the method is performed at least partially by a recording device and at least partially by a computing device.

In example 12 the subject matter of any one or more of examples 1-11 may optionally include wherein the verification information comprises a verification that the corresponding at least one identified active speaker corresponding for the at least one segment created the audio in the respective segment.

In example 13 the subject matter of any one or more of examples 1-12 may optionally include comprising providing a conference bridge for a conference call.

Example 14 includes or may optionally be combined with the subject matter of any one of examples 1-13 to include subject matter (such as a device, apparatus, or machine) comprising an audio capture module configured to: receive a voice exemplar from each of a plurality of individuals; record an audio event; a control module configured to: determine a plurality of audio event segments of the audio event, the audio event segments determined based upon changes in at least one identified active speaker, each segment having at least one corresponding identified active speaker, the identification based upon the received voice exemplars; an input and output module configured to: receive verification information for at least one segment from the corresponding at least one identified active speaker of the at least one segment; and wherein the control module is configured to produce a master audio file including the tagged segments and verification information responsive to the input and output module receiving verification information for the at least one segment.

In example 15, the subject matter of any one or more of examples 1-14 wherein the audio file is a digital audio file.

In example 16 the subject matter of any one or more of examples 1-15 may optionally include wherein the input and output module is configured to send a verification request for the at least one segment to the at least one corresponding identified active speaker for that segment.

In example 17 the subject matter of any one or more of examples 1-16 may optionally include wherein the verification request includes an audio clip of the segment.

In example 18 the subject matter of any one or more of examples 1-17 may optionally include wherein the control module is configured to automatically generate a transcript of each segment and wherein the verification request includes the transcript of the segment.

In example 19 the subject matter of any one or more of examples 1-18 may optionally include wherein the verification request includes biometric data.

In example 20 the subject matter of any one or more of examples 1-19 may optionally include wherein the biometric data includes a voice print of a recipient active speaker of the segment.

In example 21 the subject matter of any one or more of examples 1-20 may optionally include wherein the input and output module is configured to receive digital rights management information for each segment from the corresponding at least one identified active speaker for that segment, and wherein the control module is configured to produce a master audio file by at least including the digital rights management information in the master audio file.

In example 22 the subject matter of any one or more of examples 1-21 may optionally include wherein the digital rights management information defines a set of access permissions for a user group.

In example 23 the subject matter of any one or more of examples 1-22 may optionally include wherein the set of access permissions includes at least two of: read access, write access, and distribute access.

In example 24 the subject matter of any one or more of examples 1-23 may optionally include wherein the audio capture module, the control module and the input and output module is on a recording device.

In example 25 the subject matter of any one or more of examples 1-24 may optionally include wherein at least one of the audio capture module, the control module and the input and output module is on a recording device and at least one of the audio capture module, the control module and the input and output module is on a separate computing device.

In example 26 the subject matter of any one or more of examples 1-25 may optionally include wherein the verification information comprises a verification that the corresponding at least one identified active speaker for that segment created the audio in the segment.

In example 27 the subject matter of any one or more of examples 1-26 may optionally include wherein the control module is configured to provide a conference bridge for a conference call.

In example 28, the subject matter of any one or more of examples 1-27 may optionally include (a playback module configured to, instructions which when executed cause the processor to perform the operations of, or method steps comprising): receiving a command to play back the master audio file from a user; determining for a particular segment in the master audio file that the user has not satisfied a DRM condition applied to that particular segment; responsive to determining that the user has not satisfied the DRM condition applied to that particular segment, refraining from playing the audio of that segment.

In example 29, the subject matter of any one or more of examples 1-28 may optionally include (a playback module configured to, instructions which when executed cause the processor to perform the operations of, or method steps comprising): receiving a command to play back the master audio file from a user; determining for a particular segment in the master audio file that the user has satisfied a DRM condition applied to that particular segment for a first identified active speaker, but not a second DRM condition applied to that particular segment for a second identified active speaker; responsive to determining that the user has satisfied a DRM condition applied to that particular segment for a first identified active speaker, but not a second DRM condition applied to that particular segment for a second identified active speaker, playing portions of the segment in which the first identified active speaker is speaking and refraining from playing the portions of the segment in which the second identified active speaker is speaking.

In example 30, the subject matter of any one or more of examples 1-29 may optionally include (a playback module configured to, instructions which when executed cause the processor to perform the operations of, or method steps comprising): receiving a command to play back the master audio file from a user;

determining for whether the user has satisfied each of a plurality of DRM conditions applied to respective ones of the plurality of audio event segments; and playing the audio only if the user has satisfied each of a plurality of DRM conditions applied to respective ones of the plurality of audio event segments.

In example 31, the subject matter of any one or more of examples 1-30 may optionally include (a playback module configured to, instructions which when executed cause the processor to perform the operations of, or method steps comprising): receiving a command to display a transcript of the master audio file from a user; determining for a particular segment in the master audio file that the user has not satisfied a DRM condition applied to that particular segment; responsive to determining that the user has not satisfied the DRM condition applied to that particular segment, refraining from displaying the transcript of that segment.

In example 32, the subject matter of any one or more of examples 1-31 may optionally include (a playback module configured to, instructions which when executed cause the processor to perform the operations of, or method steps comprising): receiving a command to display a transcript of the master audio file from a user; determining for a particular segment in the master audio file that the user has satisfied a DRM condition applied to that particular segment for a first identified active speaker, but not a second DRM condition applied to that particular segment for a second identified active speaker; responsive to determining that the user has satisfied a DRM condition applied to that particular segment for a first identified active speaker, but not a second DRM condition applied to that particular segment for a second identified active speaker, displaying the transcript for portions of the segment in which the first identified active speaker is speaking and refraining from displaying the transcript for portions of the segment in which the second identified active speaker is speaking.

In example 33, the subject matter of any one or more of examples 1-32 may optionally include (a playback module configured to, instructions which when executed cause the processor to perform the operations of, or method steps comprising): receiving a command to display a transcript of the master audio file from a user; determining for whether the user has satisfied each of a plurality of DRM conditions applied to respective ones of the plurality of audio event segments; and displaying the transcript only if the user has satisfied each of a plurality of DRM conditions applied to respective ones of the plurality of audio event segments.

What is claimed is:

1. A method of recording audio comprising:
    using one or more processors to perform operations of:
    receiving a voice exemplar from a plurality of participants in an audio event;
    recording audio of the audio event;
    determining a first audio event segment and a second audio event segment of the recorded audio, the first and second audio event segments determined based upon identifying changes in at least one identified active speaker, the first audio event segment having a first set of one or more active speakers and the second audio event segment having a second set of one or more active speakers, the changes in at least one identified active speaker identified based upon matching the received voice exemplars with audio in the first and second audio event segments;
    receiving verification information for the first audio event segment from at least one person from the first set of active speakers for the first audio event segment, the verification information indicating an opinion of the at least one person as to whether the first audio event segment is an accurate reproduction of the audio event;
    receiving first digital rights management (DRM) information for the first audio event segment from the at least one person from the first set of active speakers;
    receiving second DRM information for the second audio event segment, the first DRM information specifying a usage restriction on the first audio event segment and the second DRM information specifying a usage restriction on the second audio event segment, wherein the first and second DRM information specify different usage restrictions; and
    responsive to receiving verification information, first DRM information, and second DRM information, producing a master audio file including the first and second audio event segments, and the verification information, wherein the master audio file implements a first DRM restriction corresponding to the first DRM information for the first audio event segment and a second DRM restriction corresponding to the second DRM information for the second audio event segment.

2. The method of claim 1, comprising sending a verification request for the first audio event segment to the at least one person from the first set of active speakers.

3. The method of claim 2, wherein the verification request includes an audio clip of the first audio event segment.

4. The method of claim 2, comprising automatically generating a transcript of the first audio event segment and wherein the verification request includes the transcript of the first audio event segment.

5. The method of claim 1, wherein the digital rights management information defines a set of access permissions for a user group.

6. The method of claim 5, wherein the set of access permissions for the first audio event segment includes at least two of: read access, write access, and distribute access.

7. The method of claim 1, wherein the method is performed by a recording device.

8. The method of claim 1, comprising:
receiving a command to play back the master audio file from a user;
determining that the user has not satisfied the usage restriction applied to the first audio event segment;
responsive to determining that the user has not satisfied the first DRM restriction applied to the first audio event segment, refraining from playing the audio of the first audio event segment; and
responsive to determining that the user has satisfied the second DRM restriction applied to the second audio event segment, playing the audio of the second audio event segment.

9. A machine readable medium that stores instructions, which when performed by a machine, cause the machine to perform operations comprising:
receiving a voice exemplar from each of a plurality of participants in an audio event;
recording audio of the audio event;
determining a first audio event segment and a second audio event segment of the recorded audio, the first and second audio event segments determined based upon identifying changes in at least one identified active speaker, the first audio event segment having a first set of one or more active speakers and the second audio event segment having a second set of one or more active speakers, the changes in at least one identified active speaker identified based upon matching the received voice exemplars with audio in the first and second audio event segments;
receiving verification information for the first audio event segment from at least one person from the first set of active speakers, for the first audio event segment, the verification information indicating an opinion of the at least one person as to whether the first audio event segment is an accurate reproduction of the audio event;
receiving first digital rights management (DRM) information for the first audio event segment from the at least one person from the first set of active speakers;
receiving second DRM information for the second audio event segment, the first DRM information specifying a usage restriction on the first audio event segment and the second DRM information specifying a usage restriction on the second audio event segment, wherein the first and second DRM information specify different usage restrictions; and
responsive to receiving verification information, first DRM information, and second DRM information, producing a master audio file including the first and second audio event segments, and the verification information, wherein the master audio file implements a first DRM restriction corresponding to the first DRM information for the first audio event segment and a second DRM restriction corresponding to the second DRM information for the second audio event segment.

10. The machine readable medium of claim 9, wherein the instructions further include instructions, which when performed by the machine, cause the machine to perform the operations of: sending a verification request for the first audio event segment to the at least one person from the first set of active speakers.

11. The machine readable medium of claim 10, wherein the verification request includes an audio clip of the first audio event segment.

12. The machine readable medium of claim 10, wherein the instructions further include instructions, which when performed by the machine, cause the machine to perform the operations of: automatically generating a transcript of the first audio event segment and wherein the verification request includes the transcript of the first audio event segment.

13. The machine readable medium of claim 10, wherein the verification request includes biometric data.

14. A system for recording audio comprising:
a computer processor;
a memory, communicatively coupled to the computer processor, and comprising instructions, which when performed by the computer processor, causes the system to perform operations to:
receive a voice exemplar from a plurality of participants in an audio event;
record audio of the audio event;
determine a first audio event segment and a second audio event segment of the recorded audio, the first and second audio event segments determined based upon identifying changes in at least one identified active speaker, the first audio event segment having a first set of one or more active speakers and the second audio event segment having a second set of one or more active speakers, the changes in at least one identified active speaker identified based upon matching the received voice exemplars with audio in the first and second audio event segments;
receive verification information for the first audio event segment from at least one person from the first set of active speakers for the first audio event segment, the verification information indicating an opinion of the at least one person as to whether the first audio event segment is an accurate reproduction of the audio event;
receive first digital rights management (DRM) information for the first audio event segment from the at least one person from the first set of active speakers;
receive second DRM information for the second audio event segment, the first DRM information specifying a usage restriction on the first audio event segment and the second DRM information specifying a usage restriction on the second audio event segment, wherein the first and second DRM information specify different usage restrictions; and produce a master audio file including the first and second audio event segments, and the verification information, wherein the master audio file implements a first DRM restriction corresponding to the first DRM information for the first audio event segment and a second DRM restriction corresponding to the second DRM information for the second audio event segment responsive to receipt of the verification information.

15. The system of claim 14, wherein the operations comprise operations to send a verification request for the first audio event segment to the at least one person from the first set of active speakers.

16. The system of claim 15, wherein the verification request includes a transcript of the first audio event segment.

17. The system of claim 14, wherein the digital rights management information defines a set of access permissions for a user group.

18. The system of claim 17, wherein the set of access permissions for the first audio event segment includes at least two of: read access, write access, and distribute access.

19. The system of claim 14, wherein the memory comprises instructions, which when performed by the computer processor, causes the system to perform operations to:
receive a command to play back the master audio file from a user;
determine that the user has satisfied the usage restriction applied to the first audio event segment;
responsive to determining that the user has not satisfied the first DRM restriction applied to the first audio event segment, refraining from playing the audio of the first audio event segment; and
responsive to determining that the user has satisfied the second DRM restriction applied to the second audio event segment, playing the audio of the second audio event segment.

* * * * *